United States Patent
Oki

(10) Patent No.: US 11,005,391 B2
(45) Date of Patent: May 11, 2021

(54) BRAKE DRIVE CIRCUIT

(71) Applicant: SUMITOMO HEAVY INDUSTRIES, LTD., Tokyo (JP)

(72) Inventor: Tomohiro Oki, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/525,155

(22) Filed: Jul. 29, 2019

(65) Prior Publication Data

US 2019/0356240 A1    Nov. 21, 2019

Related U.S. Application Data

(63) Continuation of application No. PCT/JP2018/002932, filed on Jan. 30, 2018.

(30) Foreign Application Priority Data

Feb. 3, 2017    (JP) .............................. JP2017-018173

(51) Int. Cl.
    *H02P 3/04*      (2006.01)
    *H02M 7/5387*    (2007.01)
    *F16D 65/16*     (2006.01)
    *H02M 7/48*      (2007.01)
    *H02P 15/00*     (2006.01)

(52) U.S. Cl.
    CPC .......... *H02M 7/5387* (2013.01); *F16D 65/16* (2013.01); *H02M 7/4826* (2013.01); *H02P 3/04* (2013.01); *H02P 15/00* (2013.01)

(58) Field of Classification Search
    USPC ......................................................... 318/560
    See application file for complete search history.

(56) References Cited

U.S. PATENT DOCUMENTS

| 2008/0156597 | A1  | 7/2008  | Sasaki          |             |
|--------------|-----|---------|-----------------|-------------|
| 2008/0197816 | A1  | 8/2008  | Monier et al.   |             |
| 2011/0308894 | A1  | 12/2011 | Korhonen et al. |             |
| 2013/0343092 | A1* | 12/2013 | Lin ..............| H02M 7/4807 |
|              |     |         |                 | 363/17      |

(Continued)

FOREIGN PATENT DOCUMENTS

| EP | 3006385    | A1 | 4/2016  |
|----|------------|----|---------|
| JP | S57-202899 | A  | 12/1982 |
| JP | S63-003700 | A  | 1/1988  |

(Continued)

OTHER PUBLICATIONS

Search Report issued in European Patent Application No. 18747830.0, dated Oct. 2, 2019.

(Continued)

*Primary Examiner* — Bentsu Ro
(74) *Attorney, Agent, or Firm* — Michael Best & Friedrich LLP

(57) ABSTRACT

A drive circuit for an electromagnetic brake is used in a circuit including a motor, a converter converting a DC voltage into an AC voltage to be generated between a pair of DC link buses, and an inverter converting the DC voltage into an AC voltage and driving the motor. A full-bridge circuit has a pair of power supply terminals connected to the pair of DC link buses, and a pair of output terminals connected to the electromagnetic brake.

5 Claims, 7 Drawing Sheets

(56) References Cited

U.S. PATENT DOCUMENTS

2018/0123498 A1* 5/2018 Tanabe .................. H02P 29/025

FOREIGN PATENT DOCUMENTS

| | | |
|---|---|---|
| JP | H04-111293 U | 9/1992 |
| JP | H05-044739 A | 2/1993 |
| JP | 2000-018284 A | 1/2000 |
| JP | 2001-349358 A | 12/2001 |
| JP | 2007-534284 A | 11/2007 |
| JP | 2009-014196 A | 1/2009 |
| JP | 2009-083710 A | 4/2009 |
| JP | 2010-226897 A | 10/2010 |
| JP | 2014-192919 A | 10/2014 |
| WO | WO-2005/031961 A1 | 4/2005 |
| WO | WO-2010/109791 A1 | 9/2010 |

OTHER PUBLICATIONS

International Search Report issued in Application No. PCT/JP2018/002932, dated May 1, 2018.

* cited by examiner

US 11,005,391 B2

BRAKE DRIVE CIRCUIT

RELATED APPLICATIONS

The contents of Japanese Patent Application No. 2017-018173, and of International Patent Application No. PCT/JP2018/002932, on the basis of each of which priority benefits are claimed in an accompanying application data sheet, are in their entirety incorporated herein by reference.

BACKGROUND

Technical Field

Certain embodiments of the present invention relate to a brake drive circuit.

Description of Related Art

An electromagnetic brake is widely used as means for stopping rotation of a motor. The electromagnetic brake is an example of a mechanical brake. In a non-excitation operation type electromagnetic brake, in a state in which a current does not flow through an excitation coil, an armature is pressed against a brake hub by a spring coil, and the brake is brought into a working state (holding state). In a case where a voltage is applied to the excitation coil, an electromagnet sucks the armature, and thus the brake is brought into a releasing state. Based on such characteristics, the non-excitation operation type electromagnetic brake is frequently used for an application in which safety is to be prioritized in an emergency or at the time of power failure.

As drive circuits for an electromagnetic brake, there are a normal braking circuit and a sudden braking circuit. FIG. 1 is a circuit diagram of a normal braking circuit. A rectifier 10 rectifies an AC voltage. An inverter 20 converts a DC voltage $V_{DC}$ generated by the rectifier 10 into an AC voltage, and thus drives a motor 2.

A normal braking circuit 30 includes a switch 32, a switch 34, and a half-wave rectifier 36. An AC voltage is applied to the normal braking circuit 30. The switches 32 and 34 are turned on in a releasing state, and thus a voltage obtained through half-wave rectification of an AC voltage $V_{RT}$ is applied to an excitation coil of an electromagnetic brake 4 via the half-wave rectifier 36.

The two switches 32 and 34 are turned off when the electromagnetic brake 4 is brought into a holding state. In a case where the switches 32 and 34 are turned off, a current (hereinafter, referred to as a coil current) flowing through the excitation coil of the electromagnetic brake 4 hitherto flows in a loop formed by the excitation coil and a diode D2 and attenuates at a certain time constant. In a case where the coil current is smaller than a sucking/holding current, the electromagnetic brake 4 is brought into a holding state, and slow attenuation of the coil current is a delay before the braking is performed.

An operation in an open state of the sudden braking circuit is the same as that of the normal braking circuit, and a voltage obtained through half-wave rectification is applied to the excitation coil. The sudden braking circuit has a configuration in which conduction of the excitation coil is stopped, and then a coil current flow to another path not to return to the excitation coil, when the electromagnetic brake 4 is brought into a holding state.

SUMMARY

An aspect of the present invention relates to a drive circuit for an electromagnetic brake used in a circuit including a motor, a converter converting a DC voltage into an AC voltage to be generated between a pair of DC link buses, and an inverter converting the DC voltage into an AC voltage and driving the motor. The drive circuit includes a full-bridge circuit that has a pair of power supply terminals connected to the pair of DC link buses, and a pair of output terminals connected to the electromagnetic brake.

DETAILED DESCRIPTION

Figure 1:
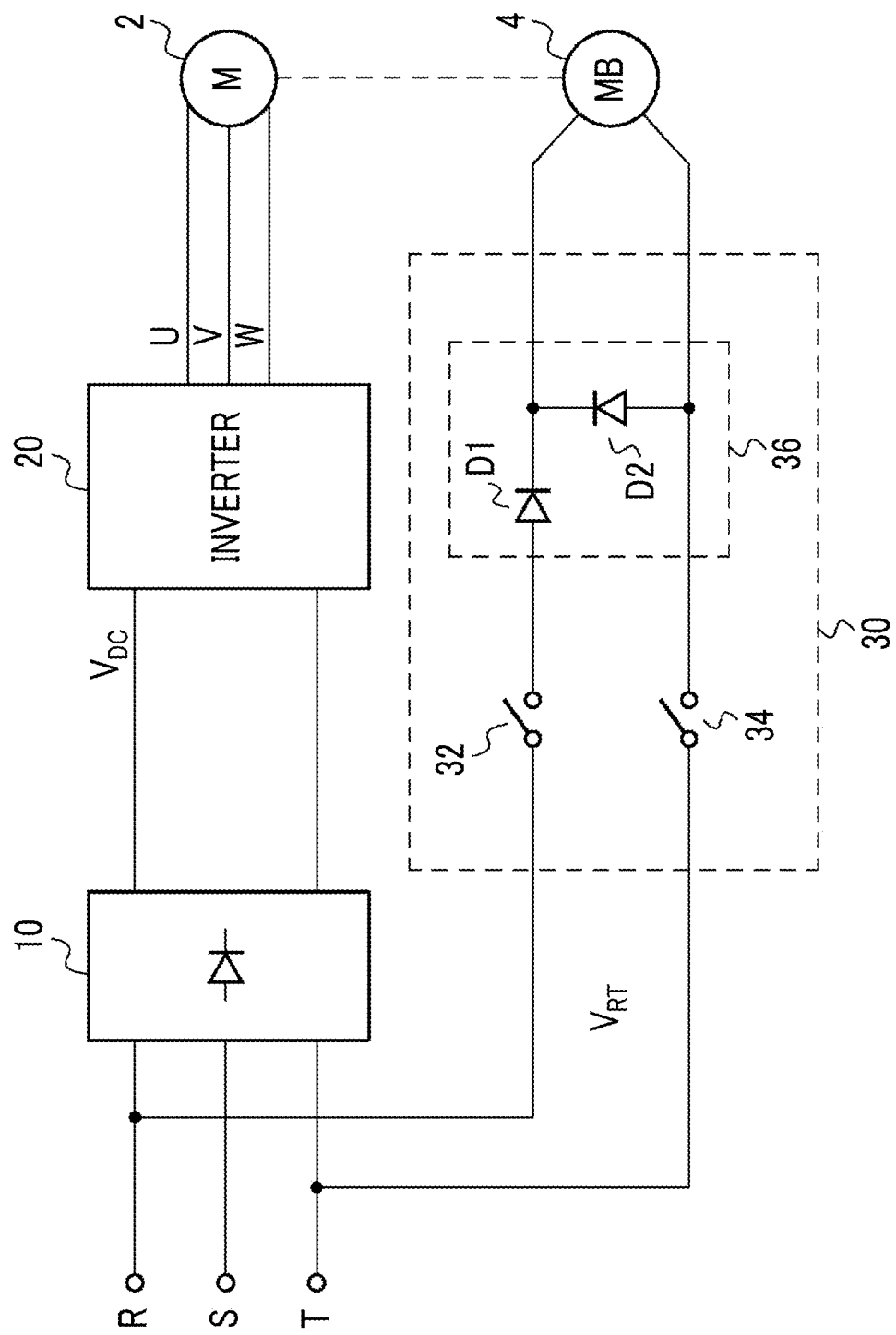
FIG. 1 is a circuit diagram of a normal braking circuit.

It is desirable to provide a novel brake drive circuit capable of suddenly braking an electromagnetic brake.

According to the aspect, the electromagnetic brake can be released by applying a drive voltage corresponding to a DC voltage at the pair of DC link buses thereto via the full-bridge circuit. In a holding state, application of the drive voltage to the electromagnetic brake via the full-bridge circuit is stopped, a current flowing through the excitation coil of the electromagnetic brake via the full-bridge circuit is returned to the DC link buses, and thus sudden braking is possible. The current in the excitation coil is not consumed in a resistor or the like, and is recovered to the DC link buses so as to be reused, and is thus excellent from the viewpoint of energy saving.

The full-bridge circuit may include a first transistor pair including two transistors provided diagonally and a second transistor pair including two transistors provided diagonally.

The full-bridge circuit may include a first transistor pair including two transistors provided diagonally and a diode pair including two diodes provided diagonally.

In a releasing state of the electromagnetic brake, a duty ratio of switching of the first transistor pair may be adjustable depending on a drive voltage to be applied to the electromagnetic brake. Consequently, it is possible to increase the degree of freedom of selection of an electromagnetic brake.

In an overexcitation period after starting, the first transistor pair (i) may be fixed to an ON state or (ii) may perform switching at a duty ratio higher than a duty ratio of switching of the first transistor pair in a releasing period after the overexcitation period.

In a braking period, the second transistor pair of the full-bridge circuit may be fixed to an ON state.

In a braking period, at least one of the two transistors of the second transistor pair of the full-bridge circuit may perform switching. Consequently, an amount of a current recovered to the DC link buses can be restricted or adjusted.

A method, an apparatus, and a system replacing any combination of the constituent elements or a constituent element or an expression of the process are also effective as aspects of the present invention.

The disclosure in this section (Solution to Problem) does not explain all the essential features of the present invention, and, therefore, the sub-combinations of the features described may also fall within the present invention.

According to the aspect of the present invention, it is possible to suddenly brake an electromagnetic brake.

Hereinafter, an embodiment of the invention will be described with reference to the drawings. Throughout the drawings, like or equivalent constituent elements, members, and processes are given the like reference numerals, and repeated description will be omitted as appropriate. The embodiment is not intended to limit the invention and is only an example, and all features described in the embodiment and combinations thereof cannot be said to be essential elements of the invention.

Figure 2:
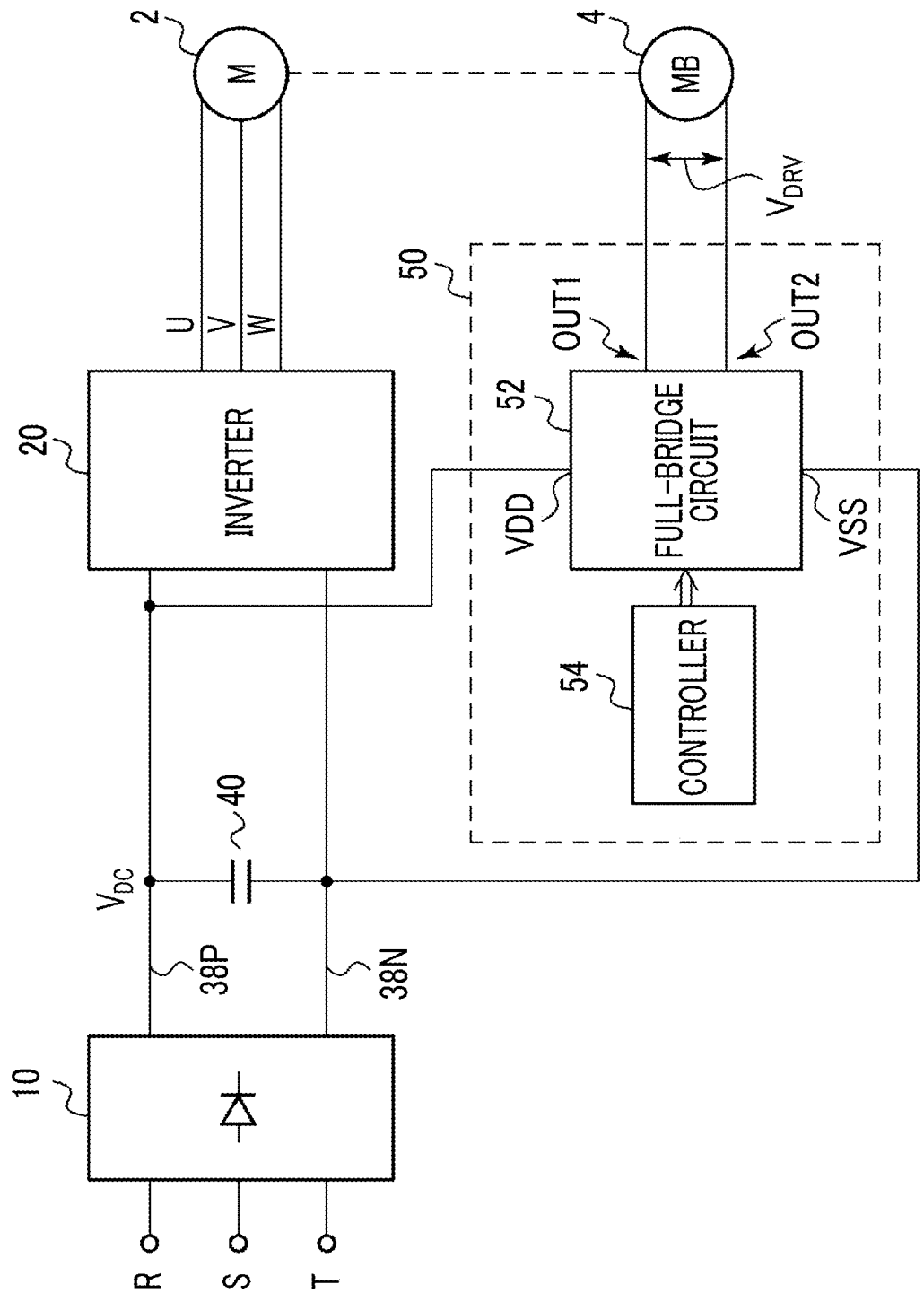
FIG. 2 is a block diagram of a circuit including a drive circuit according to an embodiment.

FIG. 2 is a block diagram of a circuit (system) 1 including a drive circuit 50 according to an embodiment. The circuit 1 includes a motor 2, an electromagnetic brake 4, a rectifier 10, an inverter 20, DC link buses 38P and 38N, a DC link capacitor 40, and the drive circuit 50.

The rectifier 10 converts an AC voltage $V_{AC}$ into a DC voltage (referred to as DC link voltage) $V_{DC}$, and generates the DC link voltage between a pair of the DC link buses 38P and 38N. The AC voltage $V_{AC}$ may be a single-phase voltage, and may be a three-phase voltage. In the present example, the AC voltage $V_{AC}$ is 400 V as a three-phase voltage, and the DC link voltage $V_{DC}$ is 600 V. The DC link capacitor 40 is connected between the DC link buses 38P and 38N. The inverter 20 converts the DC link voltage $V_{DC}$ into AC voltages $V_U$ to $V_W$, and thus drives the motor 2.

The drive circuit 50 includes a full-bridge circuit (H bridge circuit) 52 and a controller 54. The full-bridge circuit 52 has a pair of power supply terminals VDD and VSS connected to the pair of DC link buses 38, and a pair of output terminals OUT1 and OUT2 connected to the electromagnetic brake 4. The full-bridge circuit 52 includes four elements between the terminals VDD and OUT1, between the terminals VDD and OUT2, between the terminals VSS and OUT1, and between the terminals VSS and OUT2. As will be described later, the full-bridge circuit 52 is configured with a combination of switch elements or a combination of a switch element and a rectification element.

Next, a description will be made of control of the full-bridge circuit 52 in the controller 54 and an operation of the drive circuit 50.

The controller 54 controls a state of the full-bridge circuit 52, so as to switch between a releasing state and a holding state of the electromagnetic brake 4. Specifically, the controller 54 brings the full-bridge circuit 52 into an active state, and thus generates a drive voltage $V_{DRV}$ corresponding to the DC link voltage $V_{DC}$ between the pair of DC link buses 38P and 38N, between the output terminals OUT1 and OUT2 of the full-bridge circuit 52. In a case where the drive voltage $V_{DRV}$ is applied to the electromagnetic brake 4, the electromagnetic brake 4 is brought into a releasing state.

In a holding state, the controller 54 brings the full-bridge circuit 52 into an inactive state, and thus brings the output terminals OUT1 and OUT2 into a high impedance state in a fixed manner or a time division manner. Consequently, application of the forward drive voltage $V_{DRV}$ to the electromagnetic brake 4 is stopped. A current flowing through the excitation coil of the electromagnetic brake 4 is recovered to the DC link buses via the full-bridge circuit 52 without returning to the excitation coil. Consequently, sudden braking becomes possible.

The current in the excitation coil is not consumed in a resistor or the like, and is recovered to the DC link buses 38P and 38N (that is, the DC link capacitor 40). The energy can be used again, and is thus excellent from the viewpoint of energy saving.

The present invention covers various devices and circuits derived from the block diagram or the circuit diagram of FIG. 2 or the above description, and is not limited to a specific configuration. Hereinafter, more specific Examples or modification examples will be described not to limit the scope of the present invention but to help with and to clarify the understanding of the nature of the invention or a circuit operation.

EXAMPLE 1

Figure 3:
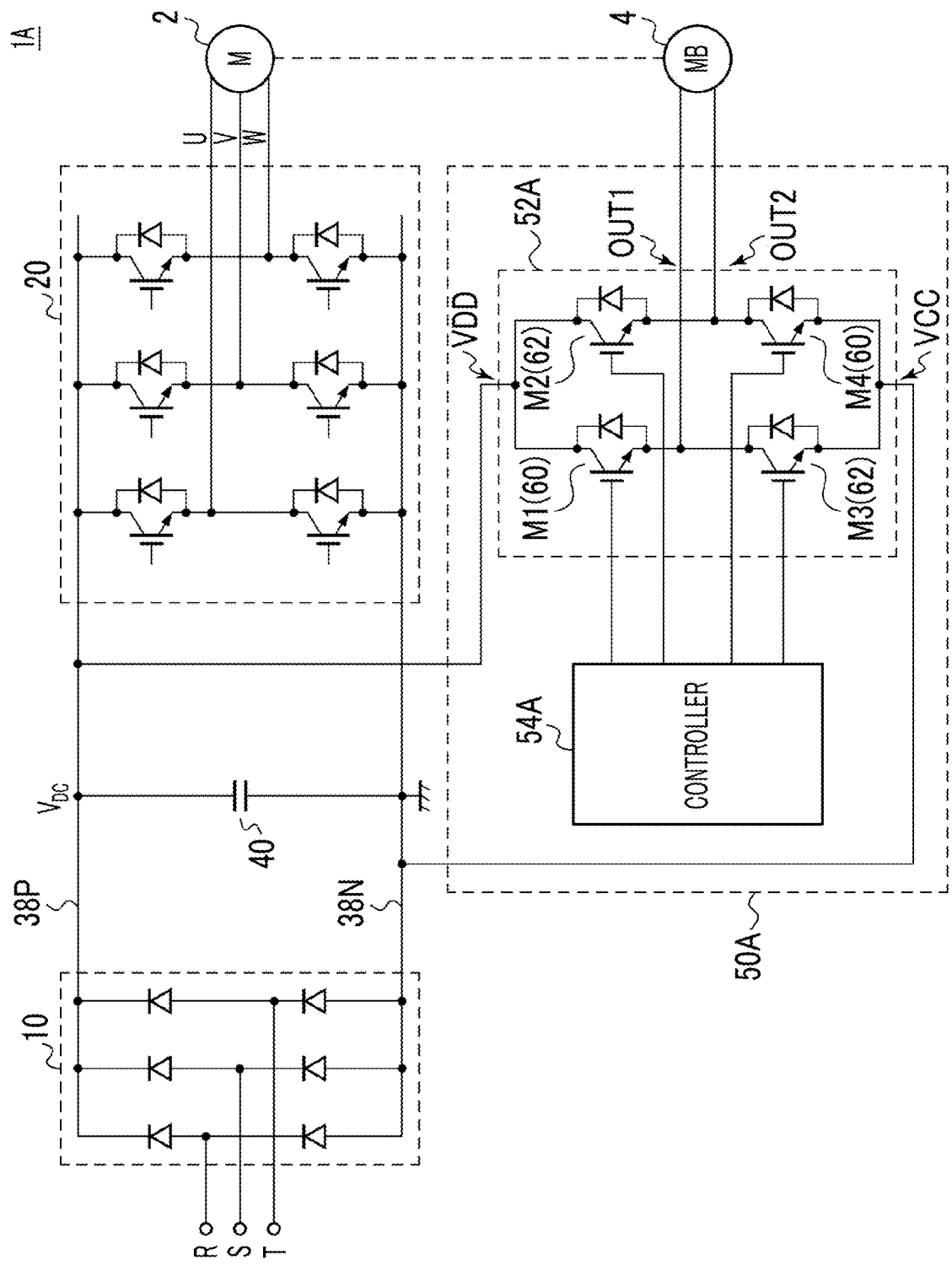
FIG. 3 is a circuit diagram of a circuit related to Example 1.

FIG. 3 is a circuit diagram of a circuit 1A related to Example 1. In the present example, the rectifier 10 is a diode bridge circuit, and the inverter 20 is a three-phase inverter.

A full-bridge circuit 52A includes a first transistor pair 60 and a second transistor pair 62. The first transistor pair 60 includes two transistors M1 and M4 diagonally provided, and the second transistor pair 62 includes two transistors M2 and M3 diagonally provided. As the transistors M1 to M4, an insulated gate bipolar transistor (IGBT), a bipolar transistor, or a metal oxide semiconductor field effect transistor (MOSFET) may be used. A controller 54A controls the four transistors M1 to M4 of the full-bridge circuit 52A. A diode is inversely connected in parallel to each of the transistors M1 to M4.

First Braking Operation

Figure 4:
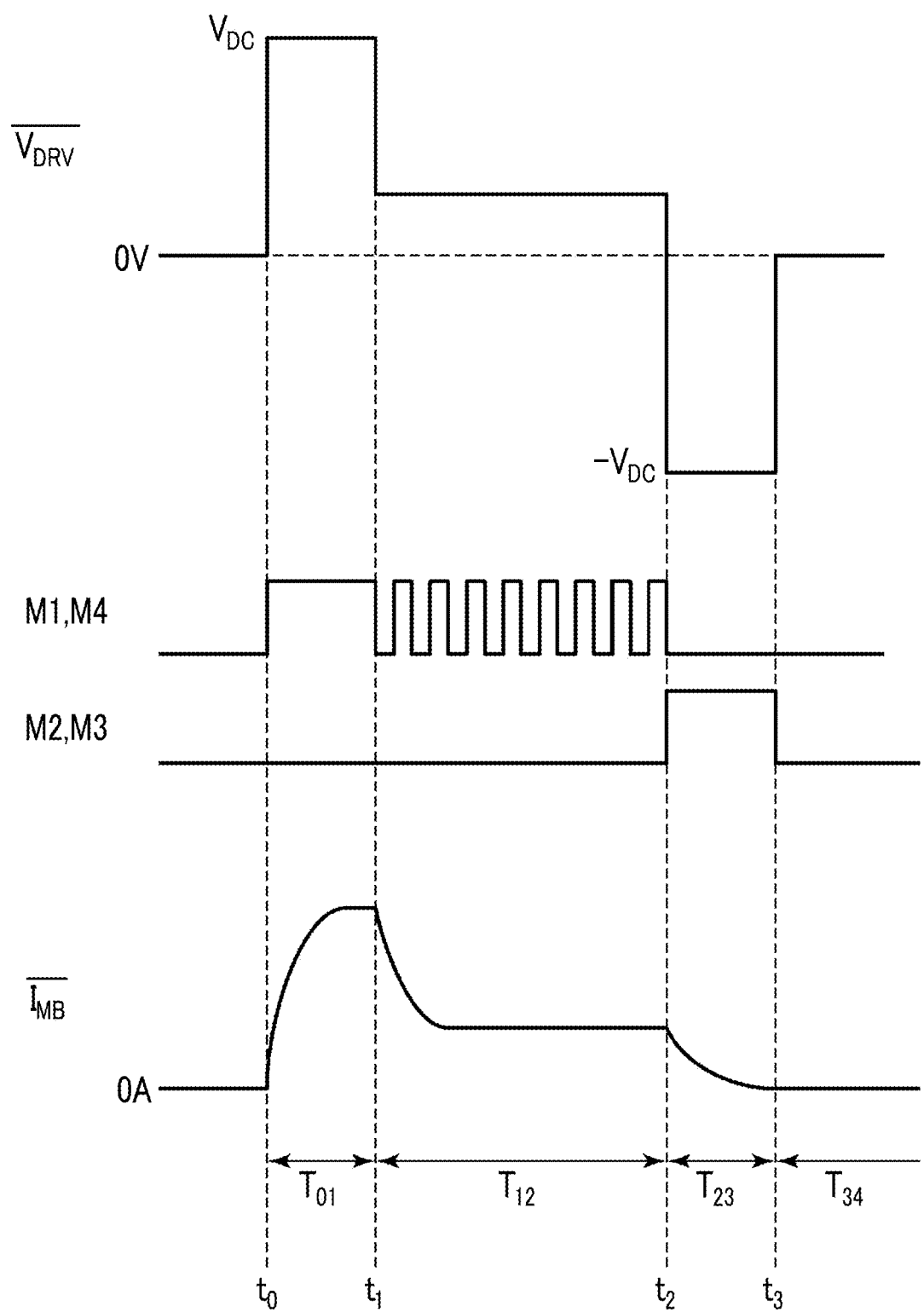
FIG. 4 is a waveform diagram illustrating a first braking operation performed by a drive circuit in FIG. 3.

FIG. 4 is a waveform diagram illustrating a first braking operation performed by a drive circuit 50A in FIG. 3. FIG. 4 illustrates a time average of the drive voltage $V_{DRV}$, a state of each transistor of the full-bridge circuit 52A, and a current $I_{MB}$ flowing through the excitation coil of the electromagnetic brake 4 in order from the top.

An operation of the drive circuit 50 is started at time point t0. In an overexcitation period $T_{01}$ right after the operation is started, the first transistor pair 60 (M1 and M4) of the full-bridge circuit 52 is fixed to an ON state, and the transistors M2 and M3 of the second transistor pair 62 are fixed to an OFF state. The drive voltage $V_{DRV}$ at this time is the same as the DC link voltage $V_{DC}$ (≅600 V). The excitation coil is strongly excited right after the starting, and thus the brake can be rapidly released.

In the subsequent releasing period $T_{12}$, the transistors M1 and M4 of the first transistor pair 60 perform switching in a state in which the transistors M2 and M3 of the second transistor pair 62 is maintained in an OFF state. In a period in which the first transistor pair 60 is in an OFF state, the coil current $I_{MB}$ flows through the diodes connected in parallel to the transistors M3 and M4.

The drive voltage $V_{DRV}$ (average) in the releasing period $T_{12}$ is $V_{DRV}=V^{DC} \times$ DUTY. DUTY indicates a duty ratio of each of the transistors M1 and M4 of the first transistor pair 60. In the releasing period $T_{12}$, the duty ratio DUTY of switching of the transistors M1 and M4 of the first transistor pair 60 may be adjusted depending on a rated voltage to be applied to the electromagnetic brake 4. The duty ratio DUTY may be determined based on a rated value $V_{DRV(SPEC)}$ of the drive voltage $V_{DRV}$ to be applied to the electromagnetic brake 4. DUTY=$V_{DRV(SPEC)}/V_{DC} \times 100\%$ In the overexcitation period $T_{01}$, the first transistor pair 60 (M1 and M4) may perform switching at a duty ratio DUTY' higher than the duty ratio DUTY in the releasing period $T_{12}$. Consequently, the excitation coil can be strongly excited in the overexcitation period $T_{01}$, and thus the degree of excitation depending on the drive voltage $V_{DRV}$ may be adjusted according to the duty ratio DUTY'. $V_{DRV}=V_{DC}\times$DUTY'

Figure 5B:
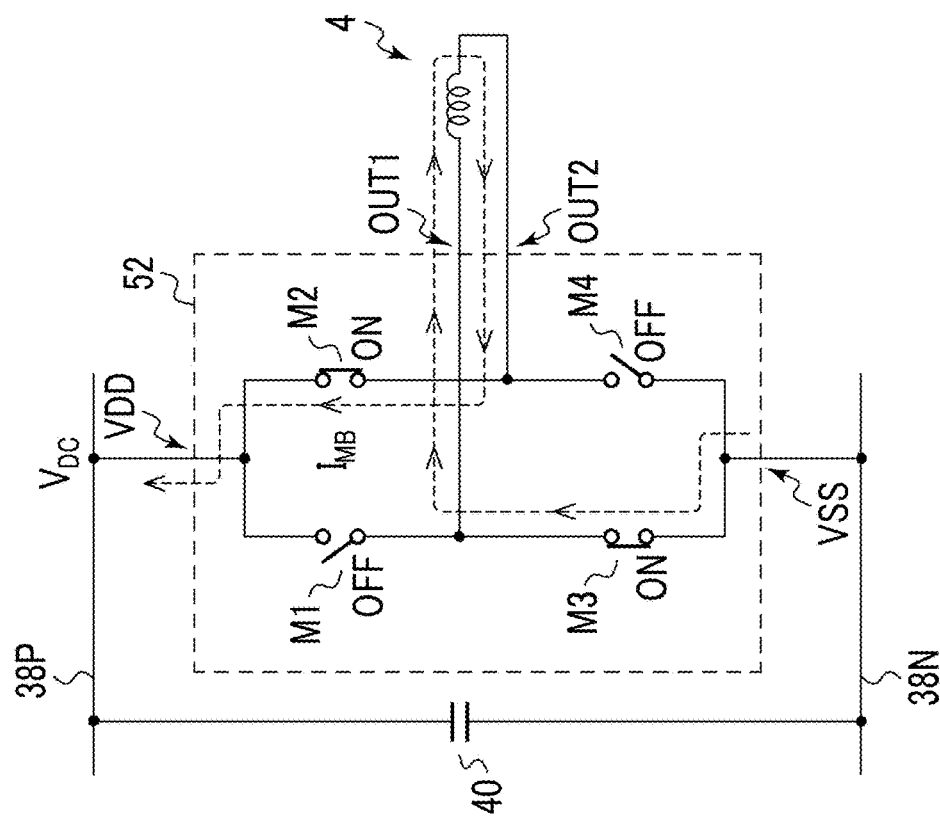
FIGS. 5A and 5B are circuit diagrams illustrating states of a full-bridge circuit in a releasing period and a braking period.
Figure 5A:
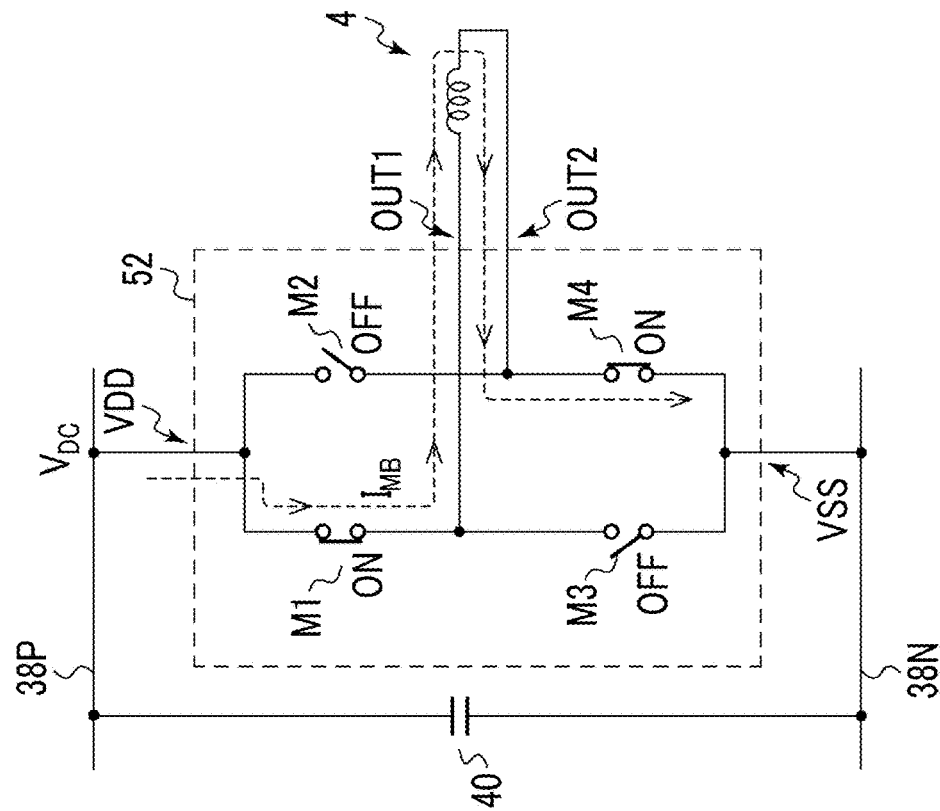

FIG. 5A is a circuit diagram illustrating a state of the full-bridge circuit 52 in the releasing period $T_{12}$. The coil current $I_{MB}$ flows from the DC link bus 38P to the DC link bus 38N via the transistor M1, an excitation coil L of the electromagnetic brake 4, and the transistor M4.

In a case where a command for brake holding is input to the controller 54 at time point t2, a braking period $T_{23}$ is started, both of the transistors M1 and M4 of the first transistor pair 60 are turned off, and the transistors M2 and M3 of the second transistor pair 62 are fixed to an ON state. In this case, a voltage of 0 V appears in the terminal OUT1, and the voltage $V_{DC}$ appears in the terminal OUT2. In other words, a voltage applied to the excitation coil is $-V_{DC}$ with a polarity opposite to the voltage in the releasing period. The voltage $-V_{DC}$ with the opposite polarity acts to attenuate the coil current $I_{MB}$.

FIG. 5B is a circuit diagram illustrating a state of the full-bridge circuit 52 in the braking period $T_{23}$. The coil current $I_{MB}$ returns from the DC link bus 38N to the DC link bus 38P via the transistor M3, the excitation coil L of the electromagnetic brake 4, and the transistor M2, and can thus be accumulated as electric charge in the DC link capacitor 40. In a case where the coil current $I_{MB}$ is smaller than a sucking/holding current, the electromagnetic brake 4 is brought into a holding state.

In a case where the coil current $I_{MB}$ is reduced to about zero, the transistors M1 to M4 are all turned off, and thus a non-excitation period $T_{34}$ occurs.

In the first braking operation, the coil current $I_{MB}$ does not return to the excitation coil in the braking period $T_{23}$.

Second Braking Operation

Figure 6:
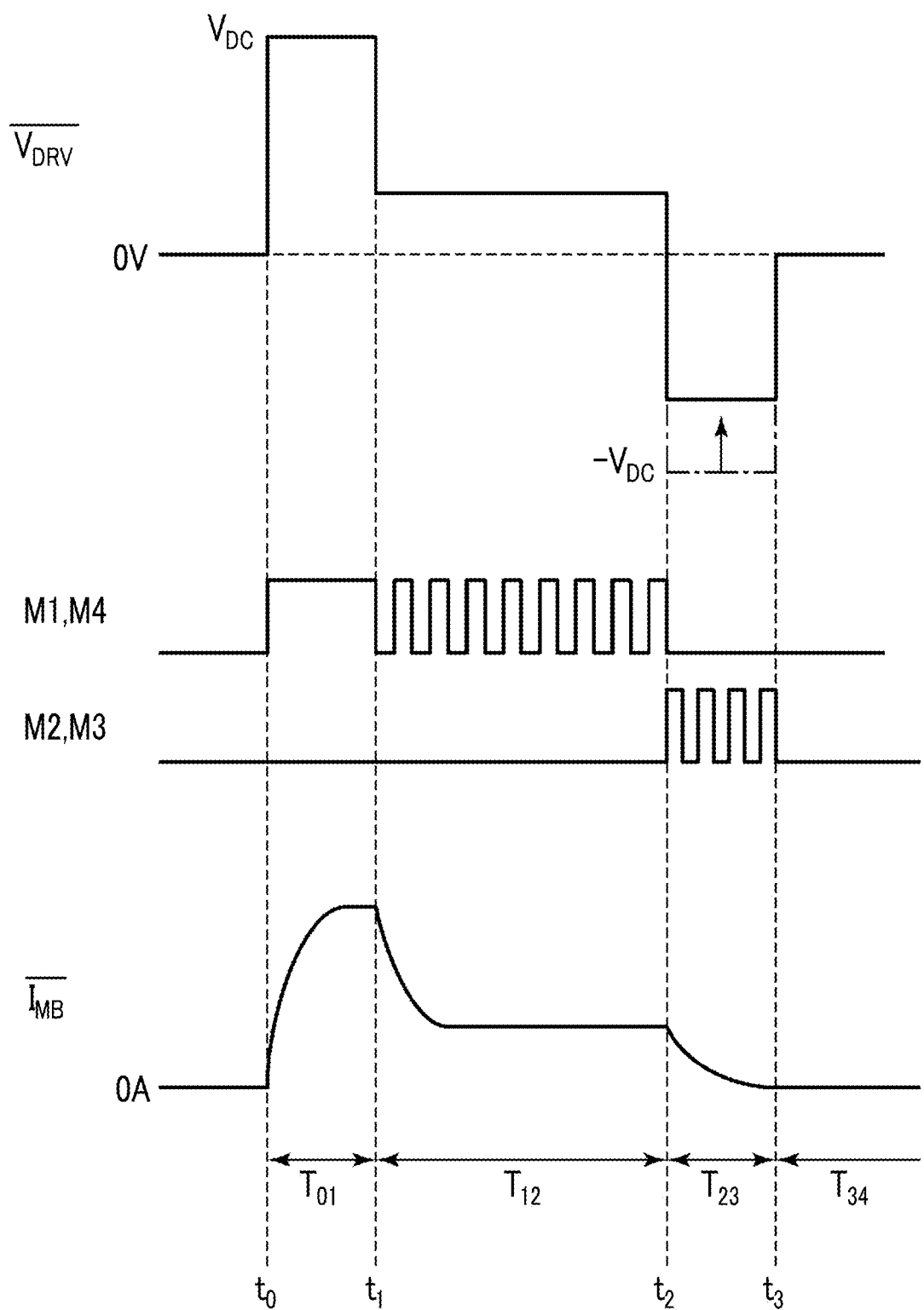
FIG. 6 is a waveform diagram illustrating a second braking operation performed by a drive circuit in FIG. 3.

FIG. 6 is a waveform diagram illustrating a second braking operation performed by the drive circuit 50A in FIG. 3. In the second braking operation, the second transistor pair 62 performs switching in the braking period $T_{23}$. In a period in which the transistors M2 and M3 of the second transistor pair 62 are turned off, the coil current $I_{MB}$ flows through the diodes connected in parallel to the transistors M2 and M3.

According to this braking operation, a voltage generated between both ends of the excitation coil in the braking period $T_{23}$ according to a duty ratio (an ON time ratio) of the second transistor pair 62, and thus an attenuation rate of the coil current $I_{MB}$ can be adjusted.

Third Braking Operation

In the braking period $T_{23}$ in FIG. 4, the first transistor pair 60 may be fixed to an OFF state, one of the transistors M2 and M3 of the second transistor pair 62 may be fixed to an ON state, and the other transistor may perform switching. According to the braking operation, an attenuation rate of the coil current $I_{MB}$ can be adjusted depending on a duty ratio (an ON time ratio) of the second transistor pair 62.

Fourth Braking Operation

In the braking period $T_{23}$ in FIG. 4, the first transistor pair 60 and the second transistor pair 62 may perform switching in a complementary manner. According to the braking operation, an attenuation rate of the coil current $I_{MB}$ can be adjusted depending on a time ratio between a period in which the first transistor pair 60 is turned on and the second transistor pair 62 is turned on.

Fifth Braking Operation

In the braking period $T_{23}$ in FIG. 4, the transistors M1 and M3 forming a leg on opposite side to a leg including one transistor M2 may perform switching in a complementary manner in a state in which one transistor M2 of the second transistor pair 62 is fixed to an ON state.

In the braking operation, in the braking period $T_{23}$, (i) a period in which the coil current $I_{MB}$ flows through the transistor M3, the excitation coil L, and the transistor M2 and (ii) a period in which the coil current $I_{MB}$ flows through an upper loop including the transistor M1, the excitation coil L, and the transistor M2 are alternately repeated.

According to the braking operation, an attenuation rate of the coil current $I_{MB}$ can be adjusted depending on a duty ratio of the transistors M1 and M3 (or M2 and M4) forming an opposite side leg.

The transistors M2 and M4 forming a leg on opposite side to a leg including one transistor M3 may perform switching in a complementary manner in a state in which one transistor M3 of the second transistor pair 62 is fixed to an ON state. In this case, in the braking period $T_{23}$, (i) a period in which the coil current $I_{MB}$ flows through the transistor M3, the excitation coil L, and the transistor M2 and (ii) a period in which the coil current $I_{MB}$ flows through a lower loop including the transistor M3, the excitation coil L, and the transistor M4 are alternately repeated.

As mentioned above, the present invention has been described based on the embodiment. The embodiment is only an example, and it is understood by a person skilled in the art that various modification examples may occur in combinations of the respective constituent elements or respective processing processes, and the modification examples are also included in the scope of the present invention. Hereinafter, such modification examples will be described.

MODIFICATION EXAMPLE 1

Figure 7:
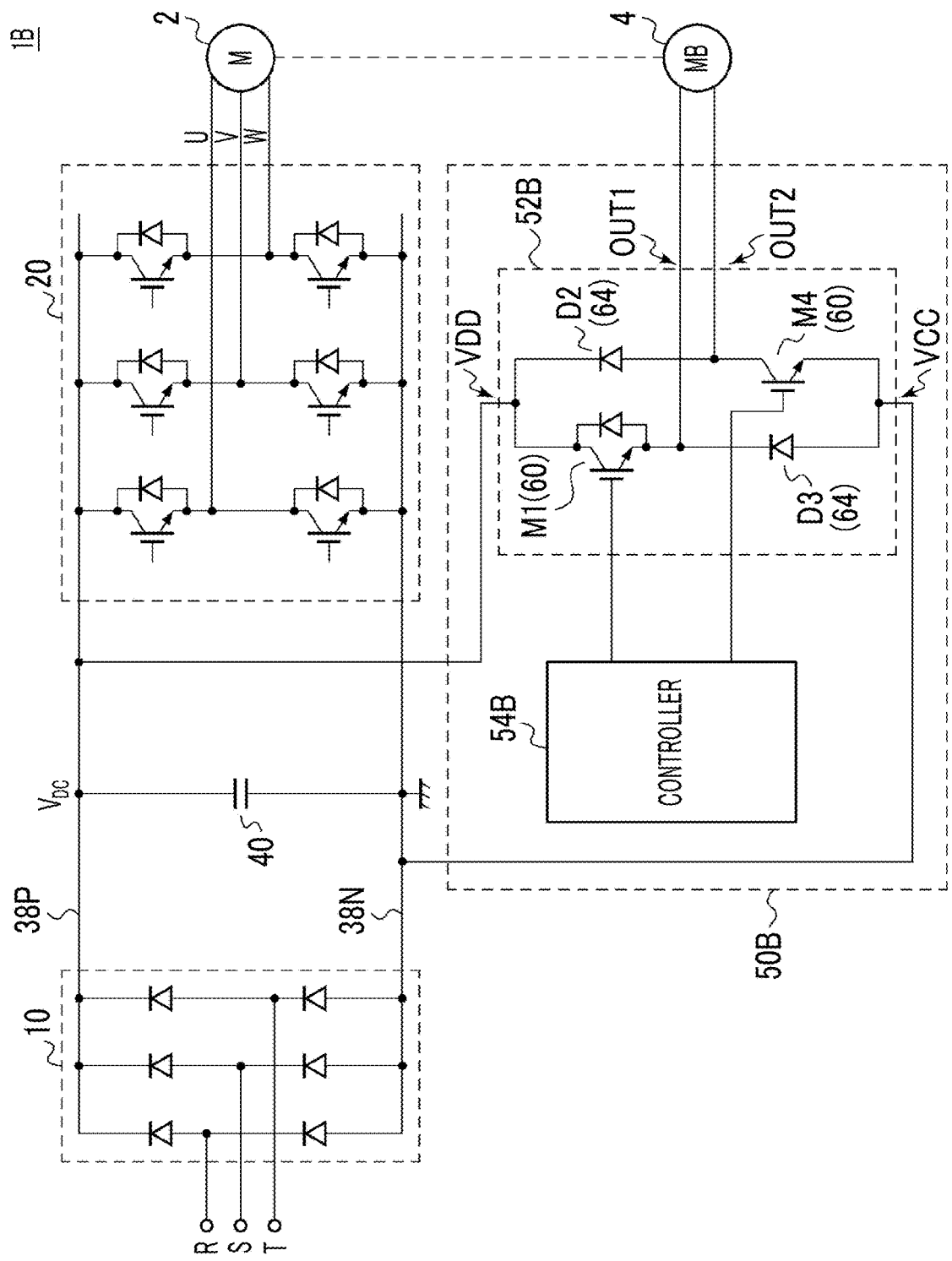
FIG. 7 is a circuit diagram of a drive circuit related to Modification Example 1.

FIG. 7 is a circuit diagram illustrating a drive circuit 50B related to Modification Example 1. A full-bridge circuit 52B of the drive circuit 50B includes a diode pair 64 having two diodes D2 and D3 instead of the second transistor pair 62 (M2 and M3) in FIGS. 5A and 5B. In the braking period $T_{23}$, the transistors M1 and M4 are turned off. An operation of the drive circuit 50B is the same as the first braking operation in FIG. 4.

MODIFICATION EXAMPLE 2

The overexcitation period $T_{01}$ in FIG. 4 may be omitted. Alternatively, in the releasing period $T_{12}$, the transistors M1 and M4 may be fixed to an ON state (duty ratio of 100%).

The present invention has been described by using specific words and phrases based on the embodiment, but the embodiment merely represents one aspect of the principles or applications of the present invention, and it is considered that various modification examples or disposition changes may occur in the embodiment within the scope without departing from the concept of the present invention. It should be understood that the invention is not limited to the above-described embodiment, but may be modified into various forms on the basis of the spirit of the invention. Additionally, the modifications are included in the scope of the invention.

The present invention is applicable to brake control.

It should be understood that the invention is not limited to the above-described embodiment, but may be modified into various forms on the basis of the spirit of the invention. Additionally, the modifications are included in the scope of the invention.

What is claimed is:

1. A drive circuit for an electromagnetic brake used in a circuit including a motor, a converter converting an AC voltage into a DC voltage to be generated between a pair of DC link buses, and an inverter converting the DC voltage into an AC voltage and driving the motor, the drive circuit comprising:
   a full-bridge circuit that comprises:
      a first transistor pair comprising two transistors provided diagonally,
      a second transistor pair comprising two additional transistors provided diagonally,
      a pair of power supply terminals connected to the pair of DC link buses, and
      a pair of output terminals connected to the electromagnetic brake,
   wherein, in a braking period of the electromagnetic brake, a first control method in which the second transistor pair of the full-bridge circuit is fixed to an ON state is selectable.

2. The drive circuit according to claim 1,
   wherein the first transistor pair comprises a diode pair including two diodes provided diagonally.

3. The drive circuit according to claim 1,
   wherein, in the braking period, a second control method in which at least one of the two additional transistors of the second transistor pair of the full-bridge circuit is switched is selectable.

4. A drive circuit for an electromagnetic brake used in a circuit including a motor, a converter converting an AC voltage into a DC voltage to be generated between a pair of DC link buses, and an inverter converting the DC voltage into an AC voltage and driving the motor, the drive circuit comprising:
   a full-bridge circuit that has:
      a pair of power supply terminals connected to the pair of DC link buses, and
      a pair of output terminals connected to the electromagnetic brake,
   wherein, in a releasing state of the electromagnetic brake, a duty ratio of switching of the first transistor pair is adjustable depending on a voltage to be applied to the electromagnetic brake.

5. A drive circuit for an electromagnetic brake used in a circuit including a motor, a converter converting an AC voltage into a DC voltage to be generated between a pair of DC link buses, and an inverter converting the DC voltage into an AC voltage and driving the motor, the drive circuit comprising:
   a full-bridge circuit that has:
      a pair of power supply terminals connected to the pair of DC link buses, and
      a pair of output terminals connected to the electromagnetic brake,
   wherein, in an overexcitation period after starting, the first transistor pair (i) is fixed to an ON state or (ii) performs switching at a duty ratio higher than a duty ratio of switching of the first transistor pair in a releasing period after the overexcitation period.

* * * * *